United States Patent
Ibarra et al.

(10) Patent No.: US 12,462,811 B2
(45) Date of Patent: Nov. 4, 2025

(54) PROCESSING AUDIO INFORMATION TO IDENTIFY PERSONS OF INTEREST

(71) Applicant: MOTOROLA SOLUTIONS, INC., Chicago, IL (US)

(72) Inventors: Christian Ibarra, Weston, FL (US); Bing Qin Lim, Penang (MY); Uvarajan Moorthy, Kedah (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 469 days.

(21) Appl. No.: 18/048,751

(22) Filed: Oct. 21, 2022

(65) Prior Publication Data

US 2024/0135935 A1 Apr. 25, 2024
US 2024/0233734 A9 Jul. 11, 2024

(51) Int. Cl.
*G10L 17/22* (2013.01)
*G06Q 10/10* (2023.01)
*G06Q 50/26* (2012.01)

(52) U.S. Cl.
CPC .............. *G10L 17/22* (2013.01); *G06Q 10/10* (2013.01); *G06Q 50/265* (2013.01)

(58) Field of Classification Search
CPC ......... G10L 13/00; G10L 13/02; G10L 15/26; G10L 17/22; G10L 15/22; G10L 2021/03646; G10L 21/0364; G10L 25/21; G10L 25/51; G10L 25/60; G10L 25/84
See application file for complete search history.

(56) References Cited

U.S. PATENT DOCUMENTS

| | | |
|---|---|---|
| 6,219,639 B1 | 4/2001 | Bakis et al. |
| 9,176,957 B2 | 11/2015 | Myslinski |
| 9,967,724 B1 * | 5/2018 | Gan .................. G06F 3/167 |
| 10,185,715 B1 * | 1/2019 | Saxe .................. G06F 16/285 |
| 10,419,312 B2 | 9/2019 | Alazraki et al. |
| 11,132,756 B2 | 9/2021 | Schuler et al. |
| 11,356,459 B2 | 6/2022 | Andreasen et al. |
| 11,580,951 B2 * | 2/2023 | Gkoulalas-Divanis ............. G06F 21/6254 |
| 2002/0193707 A1 | 12/2002 | Atlas et al. |
| 2019/0378079 A1 * | 12/2019 | Soni ................ G06Q 10/00 |
| 2021/0382948 A1 * | 12/2021 | Bastide ............ G06F 40/117 |

FOREIGN PATENT DOCUMENTS

GB 2596350 A 12/2021
WO 2021182982 A1 9/2021

* cited by examiner

*Primary Examiner* — Abdelali Serrou
(74) *Attorney, Agent, or Firm* — Michael Best & Friedrich LLP

(57) ABSTRACT

Methods and systems for processing audio information to identify persons of interest in regard to a public-safety incident. An example method includes receiving human-generated narrative statements as audio and converting the narrative statements into corresponding digital texts. The method further includes determining incriminating scores for each of the narrative statements by identifying, in the digital texts, incident information classified as not being publicly known. The method further includes determining a cumulative score for an individual based on the incriminating scores tagged to the individual, making a determination of whether the individual is a person of interest based on a comparison of the cumulative score with a fixed threshold, and performing at least one automated responsive action based on the determination.

20 Claims, 5 Drawing Sheets

400

CAD System File

CAD ID: KDJ234   Type: *Theft*
Date: *23/3/2022*  Time: 3.42am
Location:
Kitchen. Near To Kitchen Sink
*Unit 4-5, Main Street Condominium, Chicago*
Detail:
………famous painting stolen owned by 45 y.o, female …………& a fruit knife found near cut screen by back door… …shoe print at crime scene belongs to size 9 workboot…. …broken cup found nearby broken window with cut screen…….window glass found with cup debris………

Legend:
Bold: Non-Disclosed Info
*Italic* = Info Disclosed To Public/ Media

FIG. 4

| 500 | Detail Type | Bin 1 | Bin 2 | Bin 3 |
|---|---|---|---|---|
| 501 | What+How | Vague=15 E.G. "Heard Something" | Descriptive=25 E.G. "Heard Shattering Noise" | Precise=35 E.G. "Cup Breaking" |
| 502 | When | Vague=10 E.G. "At That Time", "Today" | Descriptive=20 E.G. "MidNight" | Precise=35 E.G. "8:30PM" |
| 503 | Where | Vague=10 E.G. "At The City" | Descriptive=20 E.G. "At The Sunset Park" | Precise=30 E.G. "Kitchen"/ Known Address |
| 504 | Who | Vague=15 E.G. "The Victim"/ No Gender/ Age Info | Descriptive=25 E.G. "Her"/ With Gender/ Age Info | Precise=35 E.G. "Rose" "Jack", "Their Son" |

FIG. 5

PROCESSING AUDIO INFORMATION TO IDENTIFY PERSONS OF INTEREST

BACKGROUND OF THE INVENTION

Computer Aided Dispatch (CAD) systems allow public safety operations and communications to be augmented, assisted, or partially controlled by an automated system. Law enforcement agencies use CAD systems to facilitate incident response and communication in the field. CAD systems, in some cases, are the first point of entry for information coming into a law enforcement system. Some functions of CAD systems include resource management, call taking, location verification, dispatching, unit status management, collecting initial information for an incident, providing information to one or more law-enforcement records management (RMS) systems, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 4 is a diagram illustrating possible contents of an information file used in the method of FIG. 3 according to an example.

FIG. 5 is a table illustrating a grading scale used in the method of FIG. 3 according to an example.

Figure 1:
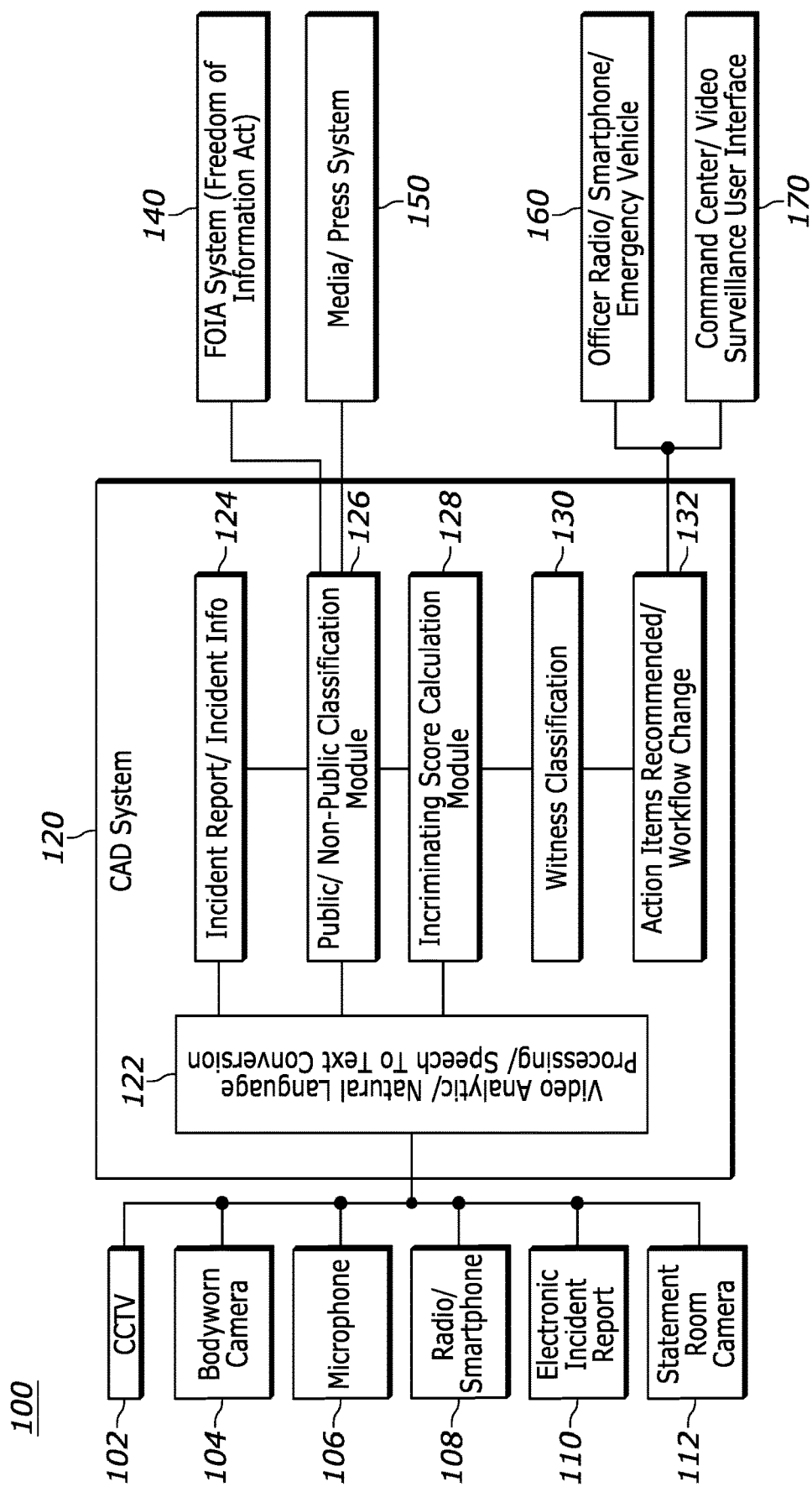
FIG. 1 is a block diagram illustrating a system for processing audio information to identify persons of interest according to various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

As described above, CAD systems can be used to facilitate rapid responses to calls for service and to affect timely arrests to curb crime. CAD systems and data managed by such systems can be used to identify problems and initiate impactful problem-solving efforts by public-safety officers. For example, when various officers are involved at a crime scene and multiple witnesses are available, coordinated efforts may be needed to identify a possible suspect in a timely manner. In particular, multiple police officers may be interviewing multiple witnesses in parallel. Each of the police officers may obtain a different respective piece of information on the incident or on a specific person. Each piece of information by itself, when not properly combined with other pieces of information, may not provide sufficient incriminating evidence to identify a suspect and to trigger an arrest. However, conventional methods may take significant time to combine the different pieces of information and analyze them in a coherent manner. Accordingly, even if the gathered information, when appropriately combined and analyzed, sufficiently incriminates a person (potential suspect), the (often significant) processing delay associated with conventional methods provides the potential suspect with sufficient time to flee the scene of the incident before a suitable counteraction is taken by the police and may impact the availability of further evidence.

The above-indicated and possibly some other related problems in the state of the art can beneficially be addressed using at least some embodiments disclosed herein. More specifically, in various examples, provided is a CAD system that performs automated processing of audio information to identify persons of interest in regard to a public-safety incident. In a representative example, the CAD system operates to profile human-generated narrative statements, such as, for example, statements captured near the site of the incident by one or more audio-capture devices, the profiling being performed based on a classification of various factual details of the incident as being publicly known or not publicly known and further based on a grading scale for determining incriminating scores. The CAD system further operates to (i) determine a cumulative incriminating score for an individual using the incriminating scores of narrative statements tagged to the individual and (ii) perform at least one automated responsive action when the cumulative incriminating score exceeds a threshold value. One of such automated responsive actions can beneficially be, e.g., an action of automatically generating an electronic warrant application with populated probable cause and instructing a police officer to apprehend the individual, without a significant delay associated with at least some conventional methods.

For example, one embodiment described herein provides a method of processing audio information to identify persons of interest in regard to a public-safety incident, the method comprising the steps of: receiving, from an audio-capture device and via an electronic processor of a CAD system, a plurality of human-generated narrative statements as audio; converting, with the electronic processor, the plurality of narrative statements into a plurality of corresponding digital texts; determining, with the electronic processor, a respective incriminating score for each of the narrative statements by identifying, in a respective one of the corresponding digital texts, incident information classified as not being publicly known; determining, with the electronic processor, a cumulative score for an individual based on one or more of the respective incriminating scores tagged to the individual; making, with the electronic processor, a determination of whether the individual is a person of interest in regard to the public-safety incident based on a comparison of the cumulative score with a fixed threshold; and performing, based on the determination, at least one automated responsive action selected from the group consisting of updating a record in a database, tagging a video associated with the audio, and generating a recommendation for a public-safety officer.

Another embodiment provides a system for processing audio information to identify persons of interest, comprising: an electronic processor; and memory including program code. The electronic processor is configured, through execution of the program code to: receive, from an audio-capture device, a plurality of human-generated narrative statements as audio; convert the plurality of narrative statements into a plurality of corresponding digital texts; determine a respective incriminating score for each of the narrative statements by identifying, in a respective one of the corresponding digital texts, incident information classified as not being publicly known; determine a cumulative score for an individual based on one or more of the respective incriminating scores tagged to the individual; make a determination of whether the individual is a person of interest in based on a comparison of the cumulative score with a fixed threshold; and perform, based on the determination, at least one automated responsive action selected from the group consisting of updating a record in a database, tagging a video associated with the audio, and generating a recommendation for a public-safety officer.

A further embodiment provides a non-transitory computer-readable medium storing instructions, that when executed by an electronic processor, perform a set of functions. The set of functions includes: receiving, from an audio-capture device, a plurality of human-generated narrative statements as audio; converting a narrative statement into a corresponding digital text; determining a respective incriminating score for the narrative statement by identifying, in the corresponding digital text, incident information classified as not being publicly known; determining a cumulative score for an individual based on the respective incriminating score tagged to the individual; making a determination of whether the individual is a person of interest based on a comparison of the cumulative score with a fixed threshold; and performing, based on the determination, at least one automated responsive action selected from the group consisting of updating a record in a database, tagging a video associated with the audio, and generating a recommendation for a public-safety officer.

FIG. 1 is a block diagram of a system 100 for processing audio information to identify persons of interest, such as, for example, in regard to a public-safety incident according to various embodiments. The system 100 includes a CAD system 120 configured to receive data from and transmit data to one or more external systems, networks, devices, or a combination thereof, nonlimiting examples of which are indicated in FIG. 1. In various examples, the CAD system 120 includes one or more computing devices (see, for example, FIG. 2), such as one or more computers, terminals, tablets, servers, and the like, and operates to perform one or more functionalities described herein below in reference to FIGS. 3-6. The various functionalities can be performed by one computing device or be distributed among multiple computing devices.

In various examples, communications between various components of the CAD system 120 and the external systems, networks, devices, or various combinations thereof are performed via one or more communication networks. Such communication networks can be implemented using wired communication components, wireless communication components, or a combination thereof and may include various types of networks, interconnections, or a combination thereof, such as, for example, a cellular network, a land mobile radio network, a trunked radio network, a wide area network (such as, for example, the Internet), a local area network (such as, for example, a Wi-Fi network), a short-range wireless network or connection, or any suitable combination thereof. In some specific examples, the CAD system 120 is configured to communicate with different external systems, networks, devices, or a combination thereof using different respective communication links. For example, the CAD system 120 may communicate with one external device over a local area network and may communicate with another external device over a wide area network. The CAD system 120 includes functional modules 122-132, a more-detailed description of which is provided below with reference to FIGS. 3-6. The CAD system 120 may include additional functional modules (not explicitly shown in FIG. 1) that are known to persons of ordinary skill in the pertinent art.

In the example illustrated in FIG. 1, the CAD system 120 is connected, in the above-indicated manner, to a CCTV (closed-circuit television) system 102, a body-worn camera 104, a microphone 106, a radio or smartphone 108, and a statement-room camera 112. The CCTV system 102 is a TV system in which signals are not publicly distributed but are monitored, primarily for surveillance and security purposes. The body-worn camera 104 is a camera worn by a public-safety officer or other authorized individual. In policing equipment, a body camera or a wearable camera, also known as a body-worn video (BWV) or a body-worn camera (BWC), is a wearable audio, video, or photographic recording system used to record events in which law enforcement officers are involved. The microphone 106 is a microphone connected to provide an audio feed to the CAD system 120 from the corresponding location. The microphone 106 can be fixedly attached to a stationary structure, such, as for example, to a wall or a pole, or to a mobile platform, such as, for example, a drone or a vehicle. The radio or smartphone 108 is a radio or smartphone deployed at the scene of an incident and connected to the CAD system 120 to provide the corresponding audio or video feed. The statement-room camera 112 is a camera located in an interview room, which is typically set up for witnesses, people involved in incidents, victims of crimes, or the like to meet with law-enforcement officers. Each of the external systems and devices 102, 104, 106, 108, and 112 operates at least as an audio-capture device that provides, to the CAD system 120, human-generated narrative statements as audio.

In various examples, the CAD system 120 communicates with different numbers of devices and different combinations of device types. In some configurations, the CAD system 120 communicates with some but not all of the different device types illustrated in FIG. 1.

The CAD system 120 is further connected to receive an electronic incident report 110. The electronic incident report 110 is an electronic record including one or more of a text file, an audio file, a video file, and the like, related to an incident. Unlike data from the external systems and devices 102, 104, 106, 108, and 112, which can be relayed to the CAD system 120 in real time, the electronic incident report 110 may be generated at an earlier time (for example, via an input entered or data captured into a tablet, smartphone, or computer) and then transmitted to the CAD system 120 at a later time. Similar to the external systems and devices 102, 104, 106, 108, and 112, the electronic incident report 110 may provide human-generated narrative statements to the CAD system 120, such as, for example, as audio or text. Herein, the term real time refers to a level of machine (for example, computer) responsiveness within a specified time constraint, usually milliseconds or microseconds, between an event and the corresponding machine-set response deadline. Since a human sense of time is slower than a typical machine-response time, real-time machine responses are perceived by humans as being immediate or substantially instantaneous.

The CAD system 120 is further connected, in the above-indicated manner, to various external public-information systems, illustratively, an FOIA (Freedom of Information Act) system 140 and a media and press information system 150. The FOIA system 140 provides public access to federal-agency records, except for those records (or portions of those records) that are protected from disclosure by applicable exemptions or exclusions. The media and press information system 150 comprises publicly accessible media channels, such as, for example, news outlets, TV channels, radio channels, newspapers, websites, and the like, in which information about the incident can be published or described. Various content filters, such as targeted searches, can be applied to the information available through the FOIA system 140 and the media and press information system 150 to narrow down the corresponding inputs to the CAD system 120 such that only the information relevant to the specific incident is inputted thereto. In some examples, the CAD system 120 is also used to control (e.g., via an input from an agency, operator, or police) which part(s) of the incident information to release to the media and press information system 150, e.g., to announce to the public as news. The released part(s) of the incident information is then classified as information disclosed to the public/media in the CAD system file (also see FIG. 4).

In operation, at least the functional modules 122, 124, 126, 128, 130, and 132 of the CAD system 120 process the various received inputs (described in more detail below in reference to FIG. 3) to make a determination of whether a particular individual is a person of interest, such as, for example, in regard to an incident. Based on the determination, the CAD system 120 performs at least one automated responsive action, such as, for example, updating a record in a database, tagging a video associated with the received audio, generating a recommendation for the police regarding the individual, generating a navigation (e.g., GPS) guide toward the pertinent individual for the police, and the like. When made, the recommendation is communicated to the pertinent entities, such as, for example, by being directed to communication equipment 160 of one or more officers, a command center 170 overseeing operations related to the incident, or a combination thereof.

Figure 2:
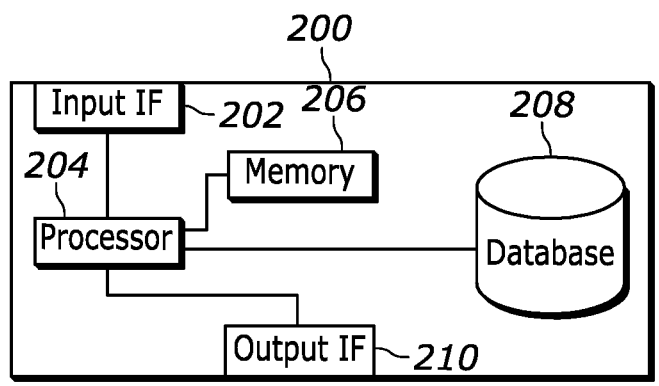
FIG. 2 is a block diagram illustrating a computing device used in the system of FIG. 1 according to various embodiments.

FIG. 2 is a block diagram illustrating a computing device 200 one or more of which are used in the CAD system 120 according to various embodiments. As illustrated in FIG. 2, in some embodiments, the computing device 200 includes an input interface (IF) 202, an electronic processor 204, a memory 206, a database 208, and an output interface (IF) 210. The components 202, 204, 206, 208, and 210 of the computing device 200 communicate with one another over one or more communication links, lines, buses, or a combination thereof. In various examples, the corresponding connections include wireline connections, optical connections, wireless connections, or various combinations thereof. In some examples, the computing device 200 includes additional components, such as, for example, additional processors, additional memory modules, additional databases, and additional interfaces. Such additional components and the shown components can be interconnected and operated in variety of different suitable configurations.

The input interface 202 operates to receive signals and messages from external systems, networks, devices, or a combination thereof such as some or all of the CCTV system 102, body-worn camera 104, microphone 106, radio or smartphone 108, electronic incident report 110, statement-room camera 112, FOIA system 140, media and press information system 150, communication equipment 160, and command center 170 (FIG. 1). The output interface 210 operates to send signals and messages to external systems, networks, devices, or a combination thereof, such as some or all of the CCTV system 102, body-worn camera 104, microphone 106, radio or smartphone 108, electronic incident report 110, statement-room camera 112, FOIA system 140, media and press information system 150, communication equipment 160, and command center 170 (FIG. 1). The input interface 202 and the output interface 210 are communicatively coupled to the processor 204, the memory 206, and the database 208. Although depicted in FIG. 2 as two separate elements, the input interface 202 and the output interface 210 are integrated into a single element in at least some examples.

In various examples, the electronic processor 204 includes a central processing unit (CPU), a digital signal processor (DSP), a microprocessor, an application-specific integrated circuit (ASIC), a field-programmable gate array (FPGA), other suitable electronic circuit, or a combination thereof. The memory 206 stores therein program code, which when executed by the electronic processor 204 enables the CAD system 120 to perform processing in accordance with some or all of the methods described herein in reference to FIGS. 3-6. The database 208 stores data received from the external systems, networks, devices, or a combination thereof, such as some or all of the CCTV system 102, body-worn camera 104, microphone 106, radio or smartphone 108, electronic incident report 110, statement-room camera 112, FOIA system 140, media and press information system 150, communication equipment 160, and command center 170 (FIG. 1). The database 208 further stores relevant data generated by the processor 204 while executing processes and methods described herein.

Figure 3:
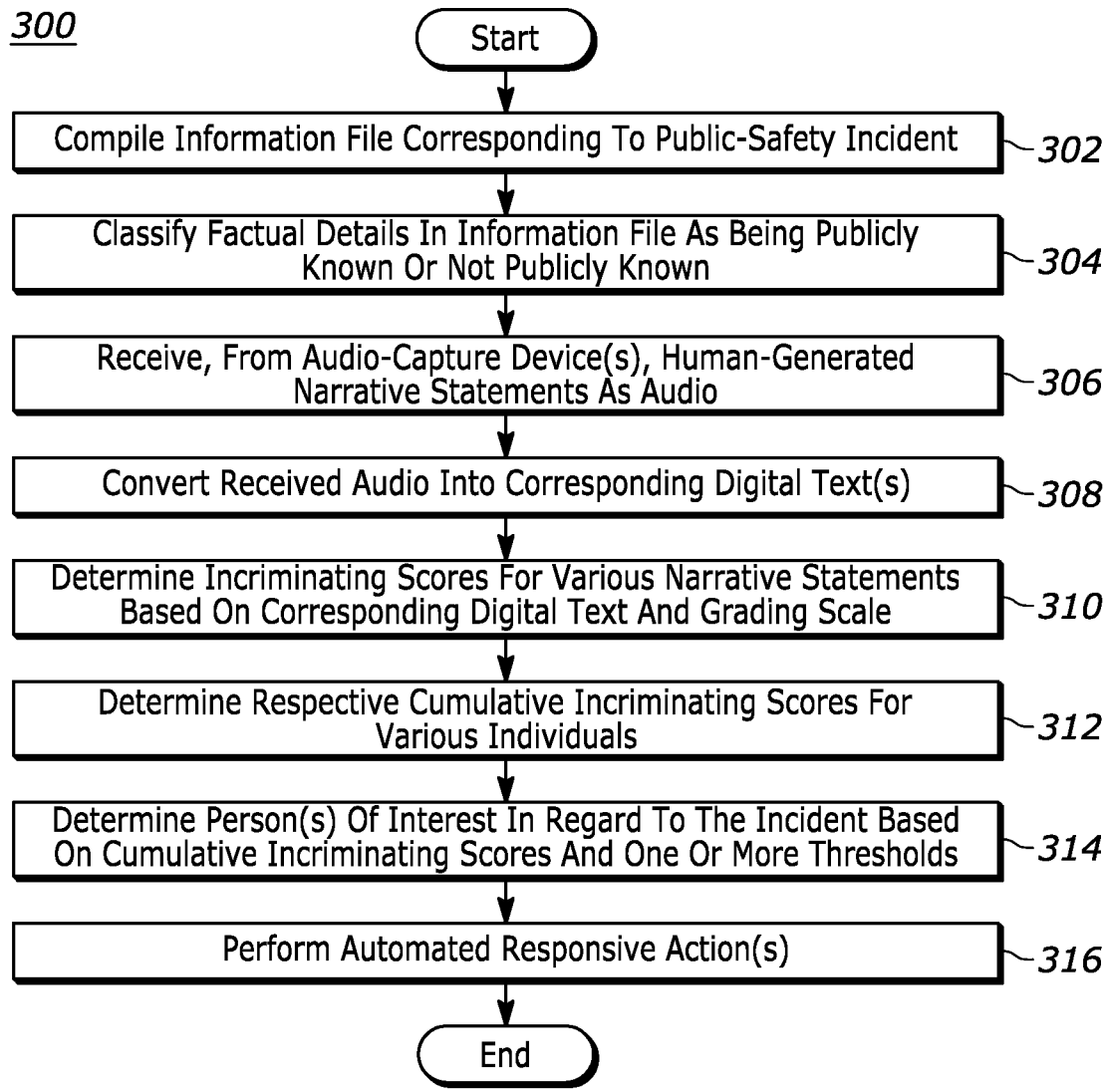
FIG. 3 is a flowchart illustrating a method of processing audio information to identify persons of interest in regard to a public-safety incident according to various embodiments.

FIG. 3 is a flowchart illustrating a method 300 of processing audio information to identify persons of interest, such as, for example, in regard to a public-safety incident according to various embodiments. In at least some examples, the method 300 is implemented using the CAD system 120 (FIG. 1) including one or more computing devices 200 (FIG. 2). The method 300 is described below in continued reference to FIGS. 1-2. Parts of the description of the method 300 also refer to FIGS. 4-6.

The method 300 includes compiling an information file corresponding to a public-safety incident (in block 302). The compiled information file includes, among other things, a set of factual details of the public-safety incident. The information-file compilation may be performed using the module 124 of the CAD system 120. In some examples, the compiled information file is stored in the database 208.

The method 300 also includes classifying (in block 304) various factual details of the compiled information file as being publicly known or not publicly known. In a representative example, the publicly known information is identified (in the block 304) based on: (i) an FOIA disclosure retrieved from the FOIA system 140; (ii) a press release, a social-media post, a news report, or other information found by searching the media/press system 150; and (iii) the part(s) of the incident information disclosed through the CAD system 120 to the media and press information system 150. The factual details not found in the systems 140, 150 are classified (in the block 304) as not being publicly known. The classification may be performed using the module 126 of the CAD system 120.

FIG. 4 is a diagram illustrating contents of an information file 400 compiled in the block 302 of the method 300 according to an example. The information file 400 includes the following fields: CAD System File Identifier (ID); Incident Type; Incident Date; Incident Time; Incident Location; and Incident Details. In the example shown in FIG. 4, on Mar. 3, 2022, at 3:42 am, an incident was reported in unit 4-5 of Main Street Condominium, in Chicago, IL. The more precise location of the crime was inside the unit near the sink in the kitchen. The factual details of the crime include the following details: (i) a famous painting was stolen, which was owned by a year old female; (ii) a fruit knife was found by the back door of the unit close to a window screen that had been cut; (iii) a shoe print found at the crime scene was from a size 9 work boot; (iv) a broken cup was also found near the cut screen; and (v) the glass of the window with the cut screen was broken and pieces of the broken window glass were found along with cup fragments.

The legend shown in FIG. 4 indicates which parts of the information file 400 are classified as being publicly known and which parts of the information file 400 are classified as not being publicly known in the block 304 of the method 300. More specifically, the facts that the crime had occurred on Mar. 3, 2022, in unit 4-5 of Main Street Condominium, in Chicago, IL, are classified as being publicly known by data received from the systems 140, 150, and not being tagged as disclosure to the system 150, in the block 304 of the method 300. The remaining details listed in the information file 400 are classified as not being publicly known because the corresponding information is not found in the systems 140, 150 in the block 304 of the method 300.

Referring back to FIG. 3, the method 300 also includes receiving, from an audio-capture device, a plurality of human-generated narrative statements as audio (in block 306). As already indicated above, each of the CCTV system 102, body-worn camera 104, microphone 106, radio or smartphone 108, electronic incident report 110, and statement-room camera 112 is an example of such an audio-capture device. In various examples, the audio received by the CAD system 120 in the block 306 is saved in the database 208 so that the processor 204 executing operations of the module 122 can access the audio therein as needed.

The method 300 also includes converting the audio (received in the block 306) into corresponding digital texts (in block 308). The module 122 of the CAD system 120 may be used for this purpose in the block 308. In various examples, the module 122 invokes various suitable automated conversion methods to perform such audio-to-text conversion in the block 308. In some examples, the module 122 relies on transcription software to generate text transcripts. Compared to audio content, a text transcript is searchable and takes up less space in the memory 206, the database 208, or both. In some examples, the transcription software is based on one or more of artificial intelligence (AI), machine learning, and natural language processing. In some examples, such as, for example, when the audio quality is relatively poor, machine-generated transcripts are manually verified, corrected, or both before being saved in the database 208 in the block 308. As known in the pertinent art, the accuracy of automatic transcription depends on several factors, such as background noises, speaker distance to the microphone, accents, and so forth.

As illustrated in FIG. 3, the method 300 also includes determining incriminating scores for narrative statements (in block 310). In a representative example, the module 128 of the CAD system 120 is used to perform operations of the block 310. More specifically, an incriminating score of a particular narrative statement by a particular individual is determined in the block 310 by: (a) identifying, in the respective digital text generated in the block 308, a portion thereof referring, directly or indirectly, to the incident information classified in the block 304 as not being publicly known; (b) based on a grading scale, assigning a respective incriminating score to each of such portions referring to the non-public information; and (c) summing the respective incriminating scores of the portions to determine the total incriminating score of the corresponding narrative statement by the individual. In some examples, an incriminating score of a particular narrative statement by a particular individual includes a component score for portions thereof in which the narrative statement refers to the incident information classified in the block 304 as being publicly known but also contains affirmative pointers to the additional knowledge of pertinent details and/or of identities of involved individuals. Such statements may receive a lower relative score than the scores applicable to the narrative statements referring to the incident information classified in the block 304 as not being publicly known but nevertheless can contribute to the total score such that an interview threshold is exceeded. The latter feature can advantageously be used to identify a broader circle of individuals to be interviewed by the police when no immediate, relatively strong leads are apparent.

In some examples, a narrative statement receives, in the block 310, an incriminating score applicable to the individual making the statement, which may indicate whether the narrative statement is self-incriminating. In some other examples, a narrative statement receives, in the block 310, an incriminating score applicable to another individual. As such, each of the incriminating scores determined in the block 310 is tagged with the corresponding identifier pointing to the individual to which the incriminating score is applicable. For example, if Mr. Smith said: "John told me just now [not publicly known specific piece of information]," then the corresponding incriminating score calculated from this specific piece of information would be tagged to John rather than being tagged to Mr. Smith.

An operation of assigning the respective incriminating score in the block 310 typically relies on establishing, with the CAD system 120, a grading scale for determining the incriminating scores. In some examples, such establishing is one of the operations performed in the block 310. In other examples, such establishing is performed in a separate configuration block of the method 300 (not explicitly shown in FIG. 3). In one example, such establishing includes: (i) dividing into several bins the range of accuracy with which a particular detail mentioned in a narrative statement matches the corresponding detail from the information file classified as not being publicly known; and (ii) assigning a different respective fixed score value to each of the several bins, such that, for example, the score values generally increase with improvements in the accuracy.

FIG. 5 is a table illustrating a grading scale 500 used in the method 300 according to an example. The grading scale 500 is based on three bins, labeled BIN1, BIN2, and BIN3 for each of detail types 501, 502, 503, and 504. The bin BIN1 represents the lowest of the three levels of accuracy, which is illustratively referred to as vague. The bin BIN2 represents the intermediate level of accuracy, which is illustratively referred to as descriptive. The bin BIN3 represents the highest of the three levels of accuracy, which is illustratively referred to as precise. For illustration purposes, the bins BIN1, BIN2, and BIN3 are shown in FIG. 5 as containing various example portions of narrative statements sorted thereinto based on the relative precision thereof with respect to the corresponding information file, such as the information file 400 illustrated in FIG. 4. Each of the bins BIN1, BIN2, and BIN3 for each of the detail types 501, 502, 503, and 504 is assigned a respective fixed incriminating score value, as indicated in FIG. 5. For each of the detail types 501, 502, 503, and 504, the incriminating score values monotonically increase with the increase of the bin number. In other words, as one example, the respective incriminating score value for the bin BIN1 is lower than the respective incriminating score value for the bin BIN2, which itself is lower than the respective incriminating score value for the bin BIN3. In various specific examples, the incriminating score values in the same bin for different detail types may or may not be the same. In some specific examples, some of the detail types have different respective numbers of bins. In some additional examples, each of the bins BIN1, BIN2, and BIN3 is assigned a fixed basic incriminating score value, which is independent of the detail type (i.e., is the same for the respective bin in the types 501, 502, 503, and 504). In such examples, each of the detail types 501, 502, 503, and 504 is also assigned a fixed multiplier which is independent of the bin number (i.e., is the same for the respective detail type in the bins BIN1, BIN2, and BIN3). The incriminating score value for a particular bin in a particular detail type is then determined by multiplying the corresponding fixed basic incriminating score value and the corresponding fixed multiplier. Other suitable methods for assigning incriminating score values to a pertinent grading scale are also possible in various other specific examples.

Figures 6A, 6B:
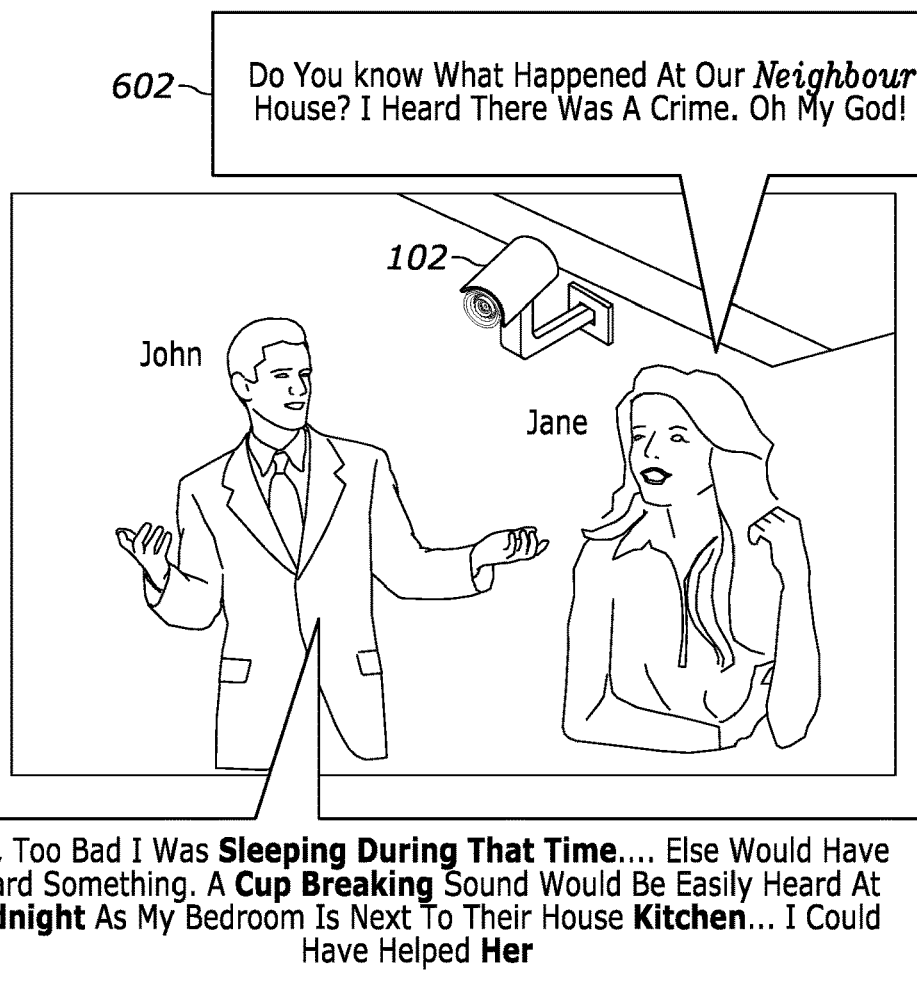
FIGS. 6A-6B illustrate some operations of the method of FIG. 3 according to an example.

FIGS. 6A-6B illustrate some operations of the method 300 according to an example. More specifically, FIG. 6A pictorially illustrates a situation in which a conversation between John and Jane about the incident corresponding to the information file 400 (FIG. 4) is captured by the CCTV 102 and is received by the CAD system 120 in the block 306 of the method 300. The transcription of the audio track of the captured video performed in the block 308 of the method 300 generates text 602 of a first narrative statement and text 604 of a second narrative statement. In the block 310 of the method 300, the text 604 is processed to determine the incriminating score thereof based on the grading scale 500 (FIG. 5). FIG. 6B is a table 610 listing individual incriminating scores of the indicated portions of the text 604 (FIG. 6A) determined in this manner. A sum of the individual incriminating scores computed in the block 310 of the method 300 yields the total incriminating score of 120 of the second narrative statement represented by the text 604.

Referring back to FIG. 3, the method 300 also includes determining a cumulative incriminating score for an individual (in block 312). In a representative example, the module 128 of the CAD system 120 is used to perform operations of the block 312. In various examples, the cumulative incriminating score is determined in the block 312 by computing a sum of the total incriminating scores tagged to the individual in the block 310. An example of one of such total incriminating scores tagged to John is described above in reference to FIG. 6B. Suppose several narrative statements received respective non-zero total incriminating scores tagged to John in the block 310 of the method 300. Then, a sum of those total incriminating scores is computed in the block 312 to obtain the cumulative incriminating score tagged to John.

The method 300 also includes making a determination of whether an individual is a person of interest in regard to the incident (in block 314). In various examples, this determination in the block 314 is based on a comparison of the individual's cumulative score with one or more fixed thresholds. The threshold values are parameters associated with the corresponding grading scale, such as the grading scale 500 (FIG. 5). In some specific examples, two different fixed thresholds are used in the block 314, with the first threshold being smaller than the second threshold. When the individual's cumulative score is lower than the first threshold, the individual is classified in the block 314 as not a person of interest. When the individual's cumulative score is higher than or equal to the first threshold, the individual is classified in the block 314 as a person of moderate interest. When the individual's cumulative score is higher than or equal to the second threshold, the individual is classified in the block 314 as a person of significant interest. In a representative example, the module 130 of the CAD system 120 is used to perform operations of the block 314. For the example grading scale 500 of FIG. 5, the example values of the first and second thresholds are 100 and 200, respectively. For other grading scales, the values of the first and second thresholds may differ from these example values. In various examples, the ratio of the first threshold value to the second threshold value is not limited to being ½.

The method 300 also includes performing at least one automated responsive action (in block 316). The automated responsive action(s) performed in the block 316 are (is) based on the determination made in the block 314. Example automated responsive actions performed in the block 316 include one or more of the following actions: (i) updating a record in the database 208; (ii) tagging a video associated with the audio that received a high incriminating score as the video possibly containing images of a person of interest; (iii) generating a recommendation for the police (for example, generating a navigation instruction for the police to go towards the person of interest, automatically filling up an arrest-warrant application form and automatically applying for a warrant, recommending an interview with the person of interest, recommending an arrest of the person of interest, etc.); and (iv) generating a list of suggested interview questions to a person of interest, e.g., to test whether or not that person knows any pieces of information about the incident that are not known or are classified as being not publicly known. With respect to the automated responsive action (i), the updated record may be one or more of the following example records: the CAD system file 400; a list of persons of interest; a timeline of investigative and/or enforcement actions; a list of addresses, telephone numbers, and/or locations pertinent to the investigative and/or enforcement actions; and a database entry. With respect to the automated responsive action (ii), the tagging may include adding metadata or scene and frame markings to the video(s). With respect to the automated responsive action (iii), the processor 204 with the memory 206 may execute one or more program scripts wherein pertinent templates are invoked, filled, and then directed (e.g., emailed) to the corresponding recipients specified in the templates. With respect to the automated responsive action (iv), the database 208 may be queried to fetch example interview questions identified based on the types of incriminating information that contributed to the total incriminating score of the corresponding person of interest. The fetched questions may be stored in the memory 206, and the corresponding file can be accessed therein by a responsible officer once the officer assignment is made in the case.

In some examples, with respect to the person of moderate interest, a typical recommendation made in the block 316 is an instruction to interview that individual. With respect to the person of significant interest, a typical recommendation made in the block 316 is an instruction to apprehend that individual. In some examples, a list of questions is suggested to the police to interview a person of moderate interest. When this person is interviewed, the incriminating score is updated based on the person's answers. If the updated incriminating score exceeds the second threshold, then the person is tagged as a person of significant interest and an updated recommendation is provided to the police, for example, a recommendation to arrest the person. Together with the latter recommendation, an automatic action of generating an electronic warrant application with populated probable cause is also typically performed. In a representative example, the module 132 of the CAD system 120 is used to perform operations of the block 316. In some examples, when a person is talking to several people (e.g., talking to another citizen and, at a later time, talk to a police officer), the audio statement of the person with the other citizen and the audio statement of the person with the police officer are both taken into account in the processing directed to calculating the total accumulated incriminating score.

In the foregoing specification, specific embodiments have been described. For example, in one embodiment, a CAD system performs automated processing of audio information to identify persons of interest in regard to an incident. The CAD system operates to profile human-generated narrative statements, such as, for example, statements captured near the site of the incident by one or more audio-capture devices, the profiling being performed based on a classification of various factual details of the incident as being publicly known or not publicly known and further based on a grading scale for determining incriminating scores. The CAD system further operates to determine a cumulative incriminating score for an individual using the incriminating scores of narrative statements tagged to the individual and to perform at least one automated responsive action when the cumulative incriminating score exceeds a threshold value. However, various embodiments are not so limited. For example, the systems and methods, as described, are not limited to public-safety incidents or public-safety systems and may be used in other contexts to classify a person, locate people with particular characteristics, interests, hobbies, affiliations, or the like. Based on the provided description, a person of ordinary skill in the pertinent art will readily understand how to make various modifications and changes without any undue experimentation and without departing from the scope of the invention as set forth in the claims below. Accordingly, the specification and figures are to be regarded in an illustrative rather than a restrictive sense, and all such modifications are intended to be included within the scope of present teachings. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An automated method of processing audio information to identify persons of interest in regard to a public-safety incident, the method comprising:
receiving, from an audio-capture device and via an electronic processor of a computer-aided dispatch (CAD) system, a plurality of human-generated narrative statements as audio;
converting, with the electronic processor, the plurality of narrative statements into a plurality of corresponding digital texts;
determining, with the electronic processor, a respective incriminating score for each of the narrative statements by identifying, in a respective one of the corresponding digital texts, incident information classified as not being publicly known;
determining, with the electronic processor, a cumulative score for an individual based on one or more of the respective incriminating scores tagged to the individual;
making, with the electronic processor, a determination of whether the individual is a person of interest in regard to the public-safety incident based on a comparison of the cumulative score with a fixed threshold; and
performing, based on the determination, at least one automated responsive action selected from the group consisting of updating a record in a database including a non-transitory computer-readable medium, tagging a video captured by a camera and associated with the audio, and generating a recommendation for transmission over a communication network to a public-safety officer.

2. The method of claim 1, further comprising:
compiling, with the electronic processor, an information file corresponding to the public-safety incident, the information file including a set of factual details of the public-safety incident; and
classifying, with the electronic processor, each of the factual details as being publicly known or not publicly known.

3. The method of claim 2, further comprising classifying, with the electronic processor, a factual detail of the set as being publicly known based on at least one selected from the group consisting of:
a freedom-of-information-act (FOIA) disclosure;
a press or electronic-media release;
a social-media post; and
a news report.

4. The method of claim 2, further comprising:
establishing, with the CAD system, a grading scale for determining incriminating scores; and
scoring, with the electronic processor, different instances of the incident information based on the information file and the grading scale.

5. The method of claim 4, further comprising sorting, with the electronic processor, the different instances of the incident information in at least three groups based on relative accuracy with which each of the different instances matches a corresponding subset of the factual details from the information file; and
wherein the grading scale is configured to assign different respective incriminating-score values to different ones of the at least three groups.

6. The method of claim 1, wherein the audio includes at least one selected from the group consisting of:
an audio portion of a video file generated by at least one selected from the group consisting of a body-worn camera, a closed-circuit television, a surveillance camera, a statement-room camera, and an incident-scene camera;
an audio portion of a wireless transmission; and
a portion of an audio feed generated by an incident-scene microphone.

7. The method of claim 1, further comprising at least one selected from the group consisting of:
tagging to the individual, in a database, the respective incriminating score of a narrative statement made by the individual; and
tagging to the individual, in the database, the respective incriminating score of a narrative statement made by another individual.

8. The method of claim 1,
wherein, when the cumulative score is between a first fixed threshold and a larger second fixed threshold, the recommendation for the public-safety officer includes an instruction to interview the individual; and
wherein, when the cumulative score matches or exceeds the larger second fixed threshold, the recommendation for the public-safety officer includes an instruction to apprehend the individual.

9. The method of claim 1, further comprising generating, with the electronic processor, a question for interviewing the individual when the cumulative score matches or exceeds the fixed threshold.

10. The method of claim 1, further comprising generating, with the electronic processor, an electronic warrant application with populated probable cause when the cumulative score matches or exceeds the fixed threshold.

11. A system for processing audio information to identify persons of interest, comprising:
an electronic processor; and
memory including program code;
wherein the electronic processor is configured, through execution of the program code to:
receive, from an audio-capture device, a plurality of human-generated narrative statements as audio;
convert the plurality of narrative statements into a plurality of corresponding digital texts;
determine a respective incriminating score for each of the narrative statements by identifying, in a respective one of the corresponding digital texts, incident information classified as not being publicly known;
determine a cumulative score for an individual based on one or more of the respective incriminating scores tagged to the individual;
make a determination of whether the individual is a person of interest in based on a comparison of the cumulative score with a fixed threshold; and perform, based on the determination, at least one automated responsive action selected from the group consisting of updating a record in a database including a non-transitory computer-readable medium, tagging a video captured by a camera and associated with the audio, and generating a recommendation for transmission over a communication network to a public-safety officer.

12. The system of claim 11, wherein the electronic processor is further configured, through execution of the program code, to:
compile an information file corresponding to a public-safety incident, the information file including a set of factual details of the public-safety incident; and
classify each of the factual details as being publicly known or not publicly known.

13. The system of claim 12, wherein the electronic processor is further configured, through execution of the program code, to classify a factual detail of the set as being publicly known based on at least one selected from the group consisting of:
a freedom-of-information-act (FOIA) disclosure;
a press or electronic-media release;
a social-media post; and
a news report.

14. The system of claim 12, wherein the electronic processor is further configured, through execution of the program code, to:
establish a grading scale for determining incriminating scores; and
score different instances of the incident information based on the information file and the grading scale.

15. The system of claim 14,
wherein the electronic processor is further configured, through execution of the program code, to sort the different instances of the incident information in at least three groups based on relative accuracy with which each of the different instances matches a corresponding subset of the factual details from the information file; and
wherein the grading scale is configured to assign different respective incriminating-score values to different ones of the at least three groups.

16. The system of claim 11, further comprising an input interface configured to receive at least one audio portion selected from the group consisting of:
an audio portion of a video file generated by one selected from the group consisting of a body-worn camera, a closed-circuit television, a surveillance camera, a statement-room camera, and an incident-scene camera;
an audio portion of a wireless transmission; and
a portion of an audio feed generated by an incident-scene microphone.

17. The system of claim 11, wherein the electronic processor is further configured, through execution of the program code, to perform at least one action selected from the group consisting of:
tag to the individual, in a database, the respective incriminating score of a narrative statement made by the individual; and
tag to the individual, in the database, the respective incriminating score of a narrative statement made by another individual.

18. The system of claim 11, wherein the electronic processor is further configured, through execution of the program code, to generate a question for interviewing the individual when the cumulative score matches or exceeds the fixed threshold.

19. The system of claim 11, wherein the electronic processor is further configured, through execution of the program code, to generate an electronic warrant application with populated probable cause when the cumulative score matches or exceeds the fixed threshold.

20. A non-transitory computer-readable medium storing instructions that, when executed by an electronic processor, cause the electronic processor to perform operations comprising a method of processing audio information to identify persons of interest, the method including:
receiving, from an audio-capture device, a plurality of human-generated narrative statements as audio;
converting a narrative statement into a corresponding digital text;
determining a respective incriminating score for the narrative statement by identifying, in the corresponding digital text, incident information classified as not being publicly known;
determining a cumulative score for an individual based on the respective incriminating score tagged to the individual;
making a determination of whether the individual is a person of interest based on a comparison of the cumulative score with a fixed threshold; and
performing, based on the determination, at least one automated responsive action selected from the group consisting of updating a record in a database including another non-transitory computer-readable medium, tagging a video captured by a camera and associated with the audio, and generating a recommendation for transmission over a communication network to a public-safety officer.

* * * * *